(12) United States Patent
Sakai et al.

(10) Patent No.: US 8,485,582 B2
(45) Date of Patent: Jul. 16, 2013

(54) STORAGE DEVICE FOR VEHICLE

(71) Applicant: Honda Motor Co., Ltd., Tokyo (JP)

(72) Inventors: Yoshihiro Sakai, Utsunomiya (JP); Yuji Saitoh, Utsunomiya (JP); Junpei Okuno, Suzuka (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/688,585

(22) Filed: Nov. 29, 2012

(65) Prior Publication Data

US 2013/0140842 A1 Jun. 6, 2013

(30) Foreign Application Priority Data

Dec. 1, 2011 (JP) .................. 2011-263602
Apr. 20, 2012 (JP) .................. 2012-096617

(51) Int. Cl.
*B60R 7/04* (2006.01)
*B60R 7/06* (2006.01)

(52) U.S. Cl.
USPC ........ 296/37.8; 296/37.12; 362/489; 362/154

(58) Field of Classification Search
USPC ............ 296/37.8, 37.12; 312/348.3; 362/489, 362/488, 154
See application file for complete search history.

(56) References Cited

U.S. PATENT DOCUMENTS

| 2,226,434 | A  | * | 12/1940 | Hirsh ........................ 312/334.5 |
| 2,820,687 | A  | * | 1/1958  | Waring ........................ 312/350 |
| 4,099,814 | A  | * | 7/1978  | Hasselberger ................ 312/205 |
| 6,315,436 | B1 | * | 11/2001 | Schenk et al. ................ 362/488 |
| 8,287,021 | B2 | * | 10/2012 | Penner ........................ 296/24.34 |
| 2002/0084666 | A1 | * | 7/2002  | Toppani ...................... 296/37.12 |
| 2004/0135391 | A1 | * | 7/2004  | Gehring et al. ............ 296/37.12 |
| 2010/0128493 | A1 | * | 5/2010  | Hipshier et al. .............. 362/459 |
| 2011/0084511 | A1 | * | 4/2011  | Evans et al. ................ 296/37.12 |
| 2012/0200107 | A1 | * | 8/2012  | Kobayashi et al. ........ 296/37.12 |
| 2013/0062901 | A1 | * | 3/2013  | Yeon ........................ 296/37.12 |

FOREIGN PATENT DOCUMENTS

JP 02-008845 Y2 3/1990

* cited by examiner

*Primary Examiner* — Jason S Morrow
(74) *Attorney, Agent, or Firm* — Carrier Blackman & Associates, P.C.; Joseph P. Carrier; William D. Blackman (57) ABSTRACT

A storage device for a vehicle includes a storage section which has a space and has an engagement hole provided on the back side in a mounting direction and in which an article is put in and taken out through an opening portion, and a detachable separator which partitions the space in the storage section, is formed in a substantially L shape having two plate sections intersecting one another when viewed from the mounting direction into the storage section, has a projecting portion which protrudes toward the front in the mounting direction and is engaged with the engagement hole, and is mounted in the engagement hole at a partitioning position to divide the space into two compartments and a compartment expanding position to form a single compartment larger than either of the two compartments in the space.

7 Claims, 9 Drawing Sheets

STORAGE DEVICE FOR VEHICLE

BACKGROUND OF THE INVENTION

1. Field of the Invention

The present invention relates to a storage device for a vehicle, which is provided in a vehicle such as a four-wheeled vehicle.

Priority is claimed on Japanese Patent Application No. 2011-263602 filed on Dec. 1, 2011 and Japanese Patent Application No. 2012-096617 filed on Apr. 20, 2012, the contents of which are incorporated herein by reference.

2. Description of Related Art

There is known a storage device in which a partitioning tubular body is provided in a glove box for an automobile so as to be able to be moved up and down, whereby the inside is partitioned at different vertical positions by the partitioning tubular body, thereby changing a storage form. In this glove box, both basal plates are stuck to both sidewall plates and the partitioning tubular body is supported by both basal plates through thin-walled hinge sections and parallel hinge sections, whereby the partitioning tubular body is made to be able to be moved up and down (refer to, for example, Japanese Examined Utility Model Application, Second Publication No. H2-8845).

In the structure described above, during running of a vehicle, the partitioning tubular body moves, and thus abnormal noise is prone to be generated. Further, if the storage form is repeatedly changed, breakage easily occurs, and thus there is a possibility that durability cannot be secured.

SUMMARY OF THE INVENTION

Therefore, the present invention has an object of providing a storage device for a vehicle in which even if a storage form is variable, abnormal noise which is generated during running of a vehicle can be suppressed and in addition, durability can be improved.

In order to achieve the above object, according to an aspect of the invention, there is provided a storage device for a vehicle including: a storage section which has a space and has an engagement hole provided on the back side in a mounting direction and in which an article is put in and taken out through an opening portion; and a detachable separator which partitions the space in the storage section, is formed in a substantially L shape having two plate sections intersecting one another when viewed from the mounting direction into the storage section, has a projecting portion which protrudes toward the front in the mounting direction and is engaged with the engagement hole, and is mounted in the engagement hole at a partitioning position to divide the space into two compartments and a compartment expanding position to form a single compartment larger than either of the two compartments in the space.

In the storage device for a vehicle according to the above aspect of the invention, it is preferable that each of the projecting portion and the engagement hole be formed at at least two locations, when the separator is disposed at the partitioning position, a first projecting portion be engaged with a first engagement hole and a second projecting portion be engaged with a second engagement hole, and when the separator is disposed at the compartment expanding position, the first projecting portion be engaged with the second engagement hole and the second projecting portion be engaged with the first engagement hole.

In the storage device for a vehicle according to the above aspect of the invention, it is preferable that the storage device for a vehicle further include locking claws which are provided at the first projecting portion and the second projecting portion, protrude to intersect the mounting direction, and are formed so as to protrude in directions opposite to each other.

In the storage device for a vehicle according to the above aspect of the invention, it is preferable that at the compartment expanding position, a first plate section of the separator follow in proximity to a first inner surface of the storage section and a second plate section of the separator follow in proximity to a second inner surface adjacent to the first inner surface of the storage section.

In the storage device for a vehicle according to the above aspect of the invention, it is preferable that in the separator, an indication that the separator is removable be given at a back surface portion in the mounting direction.

In the storage device for a vehicle according to the above aspect of the invention, it is preferable that the storage device for a vehicle further include a light source provided at a sidewall surface section of the storage section and in a state where the separator is disposed at the compartment expanding position, the light source irradiates the single compartment of the storage section.

In the storage device for a vehicle according to the above aspect of the invention, it is preferable that the storage device for a vehicle further include a light source provided at a sidewall surface section of the storage section, a slit transmitting light be provided at the separator, and in a state where the separator is disposed at the partitioning position, the light source irradiates the compartment where the light source is disposed, of the two compartments, and the light source irradiates the compartment on the opposite side to the compartment where the light source is disposed, of the two compartments, through the slit.

According to the storage device for a vehicle related to the above aspect of the invention, the separator is engaged with the engagement hole on the back side of the storage section at the projecting portion protruding toward the front in the mounting direction, thereby being mounted at the partitioning position to divide the space in the storage section into two compartments or the compartment expanding position to form a single compartment larger than either of the two compartments. For this reason, even if a storage form is variable, the mounting rigidity thereof can be secured. Further, since the separator is formed in a substantially L shape, the rigidity of the separator itself becomes high. Accordingly, even if a storage form is variable, abnormal noise which is generated during running of a vehicle can be suppressed. Further, since a resin hinge is not used, even if a storage form is repeatedly changed, breakage does not easily occur, and thus durability can be improved.

According to the storage device for a vehicle related to the above aspect of the invention, when the separator is disposed at the partitioning position, the first projecting portion is engaged with the first engagement hole and the second projecting portion is engaged with the other engagement hole. On the other hand, when the separator is disposed at the compartment expanding position, the first projecting portion is engaged with the second engagement hole and the second projecting portion is engaged with the first engagement hole. For this reason, in the respective cases of fixing the separator at the partitioning position and the compartment expanding position, since the projecting portions of two locations are engaged with the engagement holes of two locations, the number of engagement holes requiring a maximum of four locations can be reduced to two locations. Therefore, the shape of the storage section can be simplified, and thus the cost can be reduced.

According to the storage device for a vehicle related to the above aspect of the invention, since the locking claws are formed in directions opposite to each other at the first projecting portion and the second projecting portion, it is possible to make each locking claw be locked to the same locking portion of the engagement hole at the partitioning position and the compartment expanding position. Therefore, the shape of the engagement hole of the storage section can be simplified, and thus the cost can be reduced.

According to the storage device for a vehicle related to the above aspect of the invention, at the compartment expanding position, the first plate section of the separator follows in proximity to the first inner surface of the storage section and the second plate section of the separator follows in proximity to the second inner surface of the storage section. For this reason, the size (the volume) of the compartment in the storage section can be increased close to the maximum without being interfered by the separator.

According to the storage device for a vehicle related to the above aspect of the invention, since an indication that the separator is removable is provided at the back surface portion of the separator, it is possible to make a crew recognize the fact that the separator is removable.

According to the storage device for a vehicle related to the above aspect of the invention, in a state where the separator is disposed at the compartment expanding position to form a large single compartment in the storage section, the large single compartment of the storage section is directly irradiated with light by the light source provided in the large single compartment. Further, in a state where the separator is disposed at the partitioning position to form two compartments in the storage section, the compartment where the light source is disposed, of the two compartments separated by the separator, is directly irradiated with light from the light source. On the other hand, the compartment on the opposite side to the compartment where the light source is disposed, of the two compartments separated by the separator, is irradiated with light penetrating the slit of the separator from the light source. Therefore, the large single compartment which is formed by the separator disposed at the compartment expanding position and the two compartments which are formed by the separator disposed at the partitioning position can be irradiated with light by the single light source, and thus the cost can be reduced. Further, since a lighting window is formed by the slit, falling of an article through the lighting window can be suppressed.

DETAILED DESCRIPTION OF THE INVENTION

A storage device for a vehicle related to a first embodiment of the invention will be described below with reference to FIGS. 1 to 15.

Figure 1:
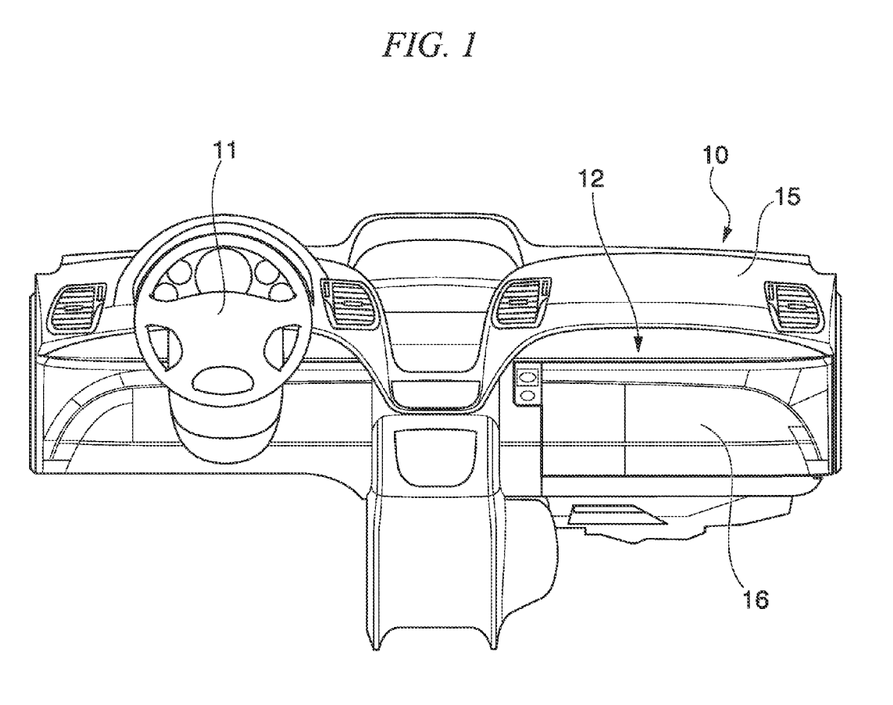
FIG. 1 is a front view showing an instrument panel which includes a storage device for a vehicle related to a first embodiment of the invention.

FIG. 1 shows an instrument panel 10 of a vehicle. As shown in FIG. 1, a storage device for a vehicle 12 related to the first embodiment is provided on the opposite side to a steering wheel 11 in the vehicle width direction (the left-and-right direction in FIG. 1) of the instrument panel 10, that is, on the front passenger seat side. That is, the storage device for a vehicle 12 is a glove box.

The instrument panel 10 has an instrument panel main body 15 and a lid 16 disposed on the opposite side to the steering wheel 11 of the instrument panel main body 15. The lid 16 is provided on the rear side (the right side in FIG. 2) in the vehicle front-and-back direction of the instrument panel main body 15 and supported on the instrument panel main body 15 so as to be able to swing around a lower portion of the instrument panel main body 15, as shown in FIG. 2.

Figure 2:
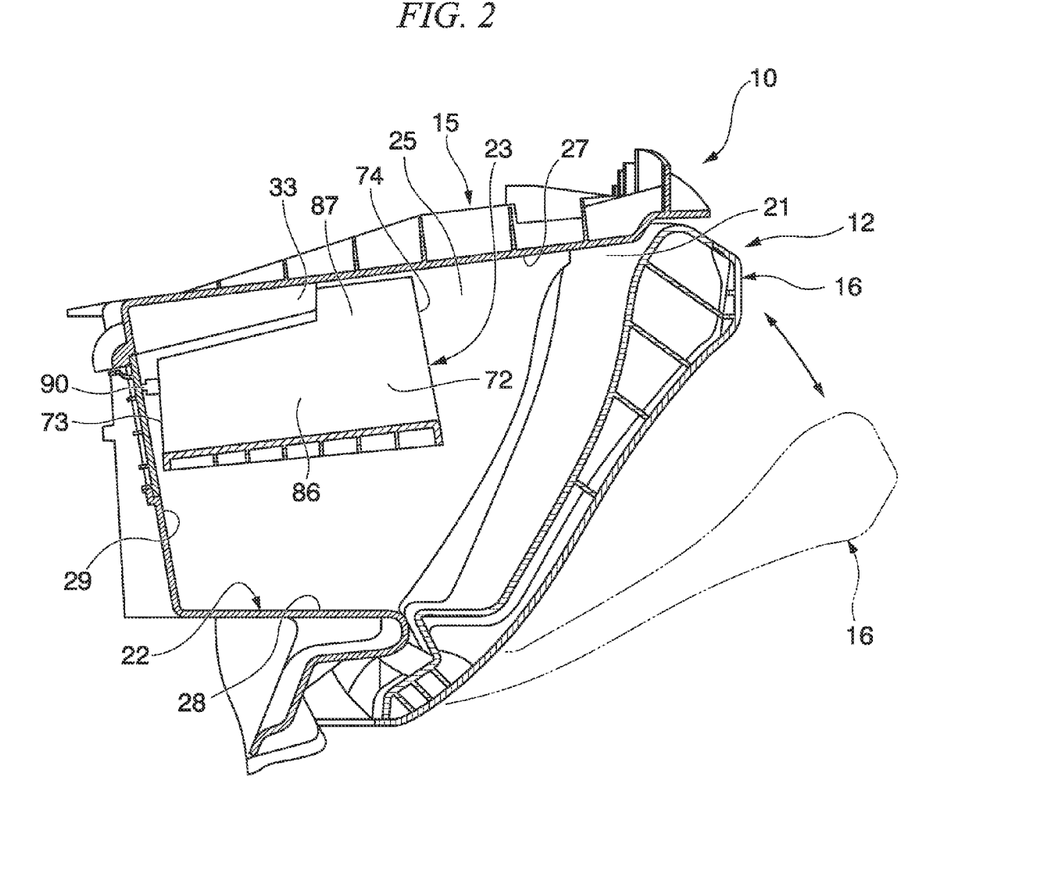
FIG. 2 is a cross-sectional side view showing the storage device for a vehicle related to the first embodiment of the invention.
Figure 3:
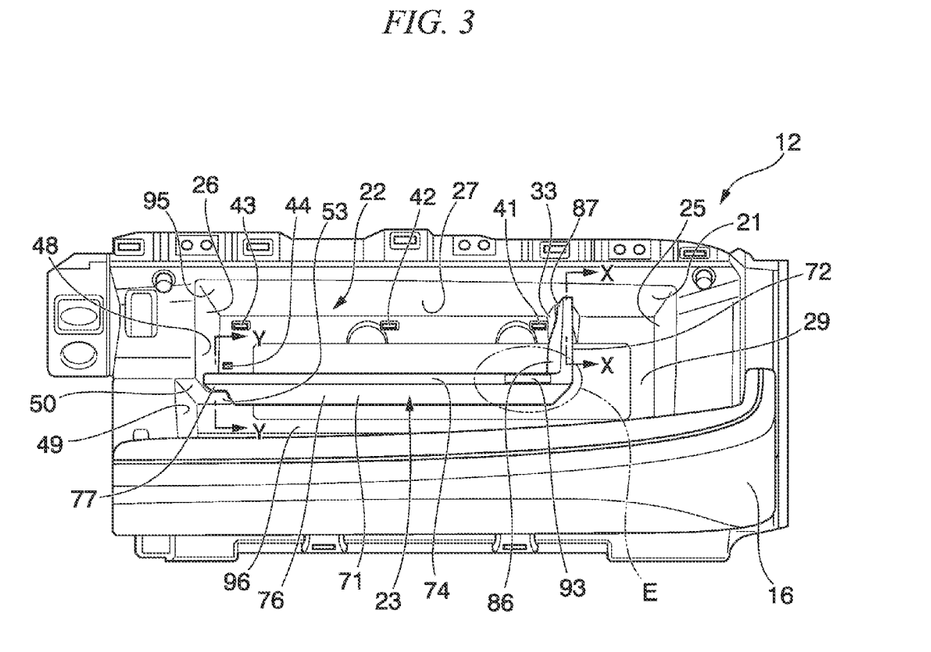
FIG. 3 is a front view showing the storage device for a vehicle related to the first embodiment of the invention when a lid is opened.

The storage device for a vehicle 12 has the lid 16 described above, a storage section 22 having an opening portion 21 which is opened and closed by the lid 16, on the rear side in the vehicle front-and-back direction, and formed in the instrument panel main body 15 into a shape which is recessed toward the front in the vehicle front-and-back direction from the opening portion 21, and a detachable separator 23 partitioning a space in the storage section 22, as shown in FIGS. 2 and 3.

Figure 4:
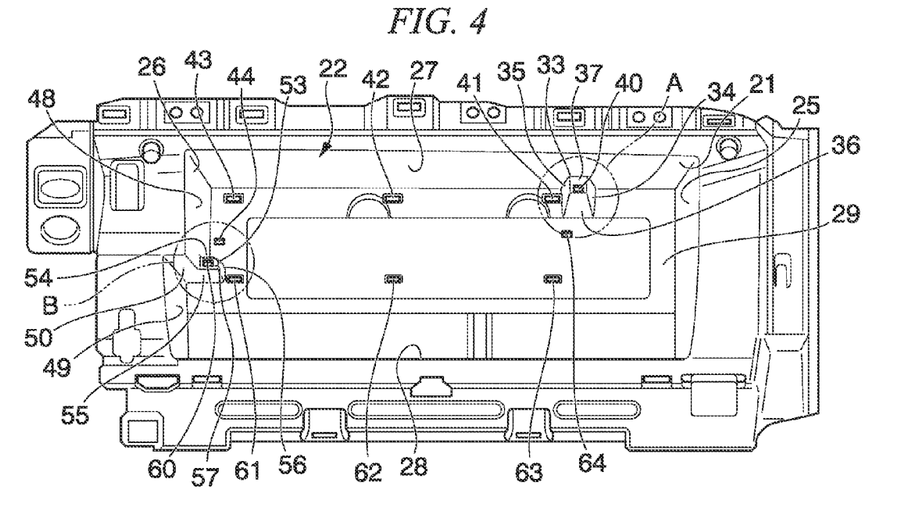
FIG. 4 is a front view showing a storage section of the storage device for a vehicle related to the first embodiment of the invention.

In the storage section 22, an article is put in and taken out through the opening portion 21. The storage section 22 is a synthetic resin molded product. The storage section 22 has sidewall surface sections 25 and 26 which are disposed on both sides in the vehicle width direction to be substantially perpendicular to the vehicle width direction (the left-and-right direction in FIG. 4), as shown in FIG. 4. The storage section 22 has a ceiling surface section 27 which connects upper edge portions of the sidewall surface sections 25 and 26, and a bottom surface section 28 which connects lower edge portions of the sidewall surface sections 25 and 26. The storage section 22 has a back surface section 29 closing the opposite side to the opening portion 21 which is formed by the sidewall surface sections 25 and 26, the ceiling surface section 27, and the bottom surface section 28. The ceiling surface section 27 and the bottom surface section 28 follow the vehicle width direction and also follow the vehicle front-and-back direction, and the back surface section 29 is substantially perpendicular to the ceiling surface section 27, the bottom surface section 28, and the sidewall surface sections 25 and 26.

In the vicinity of the boundary position between the back surface section 29 and the ceiling surface section 27, a mounting seat section 33 protruding toward the opening portion 21 from the back surface section 29 and also protruding toward the bottom surface section 28 from the ceiling surface section 27 is formed nearer to the sidewall surface section 25 on one side (the opposite side to the steering wheel 11 shown in FIG. 1) than the central positions in the vehicle width direction of the back surface section 29 and the ceiling surface section 27.

Figure 5:
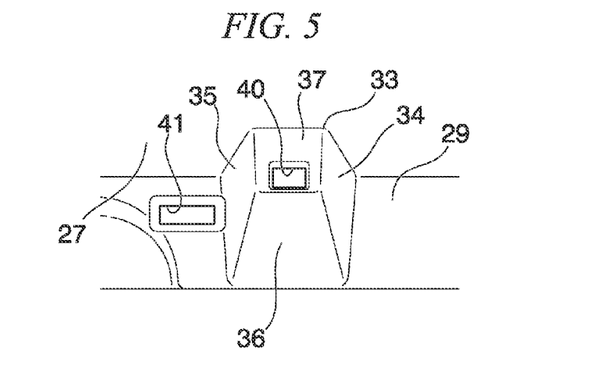
FIG. 5 is a partial enlarged view of portion A in FIG. 4, showing the storage section of the storage device for a vehicle related to the first embodiment of the invention.

The mounting seat section 33 has extending plate sections 34 and 35, as shown in FIG. 5. The extending plate sections 34 and 35 are provided on both sides in the vehicle width direction (the left-and-right direction in FIG. 5), extend from the back surface section 29, and also extend from the ceiling surface section 27. Further, the mounting seat section 33 has an extending plate section 36. The extending plate section 36 extends from the back surface section 29 and connects end edge portions of the extending plate sections 34 and 35, which are located on the opposite side to the ceiling surface section 27. The mounting seat section 33 has a seat plate section 37. The seat plate section 37 extends from the ceiling surface section 27 and connects end edge portions of the extending plate sections 34 to 36, which are located on the opposite side to the back surface section 29. The seat plate section 37 of the mounting seat section 33 follows the back surface section 29, and an engagement hole 40 having a rectangular hole shape long in the vehicle width direction is formed in the seat plate section 37.

As shown in FIG. 4, engagement holes 41 to 43 each having a rectangular hole shape long in the vehicle width direction are provided adjacent to the ceiling surface section 27 in the back surface section 29. The engagement hole 41 is formed at a position just under the mounting seat section 33 and close to the sidewall surface section 26. The engagement hole 42 is formed substantially at the central position between the mounting seat section 33 and the sidewall surface section 26. The engagement hole 43 is formed at a position close to the sidewall surface section 26. The engagement holes 41 to 43 are formed on the same straight line along the vehicle width direction. Further, an engagement hole 44 having a rectangular hole shape long in the vehicle width direction is provided in the back surface section 29. The engagement hole 44 is formed at a position closer to the bottom surface section 28 than the engagement hole 43.

The sidewall surface section 26 has a step (a step shape) formed by surface portions 48, 49, and 50. In the sidewall surface section 26, the surface portion 48 is formed at a position close to the ceiling surface section 27 and the surface portion 49 is formed at a position close to the bottom surface section 28. The surface portions 48 and 49 face the sidewall surface section 25. The surface portion 50 connects a lower end edge portion of the surface portion 48 and an upper end edge portion of the surface portion 49.

A mounting seat section 53 is formed in the vicinity of the boundary position between the back surface section 29 and the sidewall surface section 26. The mounting seat section 53 is provided at a position slightly closer to the bottom surface section 28 than the center between the ceiling surface section 27 and the bottom surface section 28, protrudes toward the opening portion 21 from the back surface section 29, and also protrudes toward the sidewall surface section 25 from the sidewall surface section 26.

Figure 6:
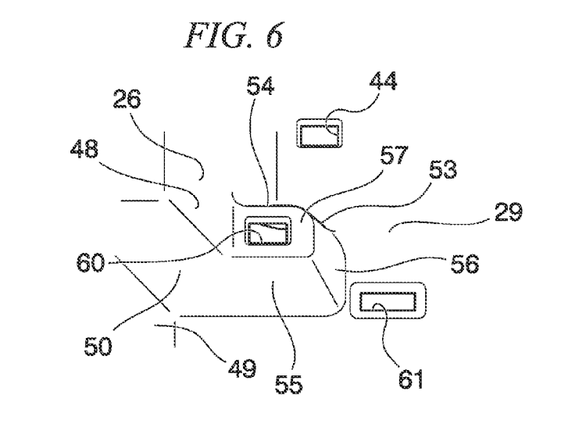
FIG. 6 is a partial enlarged view of portion B in FIG. 4, showing the storage section of the storage device for a vehicle related to the first embodiment of the invention.

The mounting seat section 53 has extending plate sections 54 and 55, as shown in FIG. 6. The extending plate sections 54 and 55 are provided the upper and lower both sides of the mounting seat section 53, extend from the back surface section 29, and also extend from the sidewall surface section 26. Further, the mounting seat section 53 has an extending plate section 56. The extending plate section 56 extends from the back surface section 29 and connects end edge portions of the extending plate sections 54 and 55, which are located on the opposite side to the sidewall surface section 26. The mounting seat section 53 has a seat plate section 57. The seat plate section 57 extends from the sidewall surface section 26 and connects end edge portions of the extending plate sections 54 to 56, which are located on the opposite side to the back surface section 29. The extending plate section 55 which is located on the lower side of the mounting seat section 53 is formed in the same plane as the surface portion 50. The seat plate section 57 of the mounting seat section 53 follows the back surface section 29, and an engagement hole 60 having a rectangular hole shape long in the vehicle width direction is formed in the seat plate section 57.

As shown in FIG. 4, engagement holes 61 to 63 each having a rectangular hole shape long in the vehicle width direction are provided in the back surface section 29. The engagement hole 61 is formed at a position just under the mounting seat section 53 and close to the sidewall surface section 25. The engagement hole 62 is formed at a position close to the mounting seat section 53 between the mounting seat section 53 and the sidewall surface section 25. The engagement hole 63 is formed at a position close to the sidewall surface section 25 between the mounting seat section 53 and the sidewall surface section 25. The engagement holes 61 to 63 are formed on the same straight line along the vehicle width direction. Further, an engagement hole 64 having a rectangular hole shape long in the vehicle width direction is provided in the back surface section 29. The engagement hole 64 is formed at a position closer to the ceiling surface section 27 than the engagement hole 63.

The seat plate sections 37 and 57 are formed such that a distance from the back surface section 29 to the seat plate section 37 of the mounting seat section 33 and a distance from the back surface section 29 to the seat plate section 57 of the mounting seat section 53 become equal to each other. As a result, a distance from the back surface section 29 to the engagement hole 40 of the mounting seat section 33 and a distance from the back surface section 29 to the engagement hole 60 of the mounting seat section 53 are the same.

Figure 7:
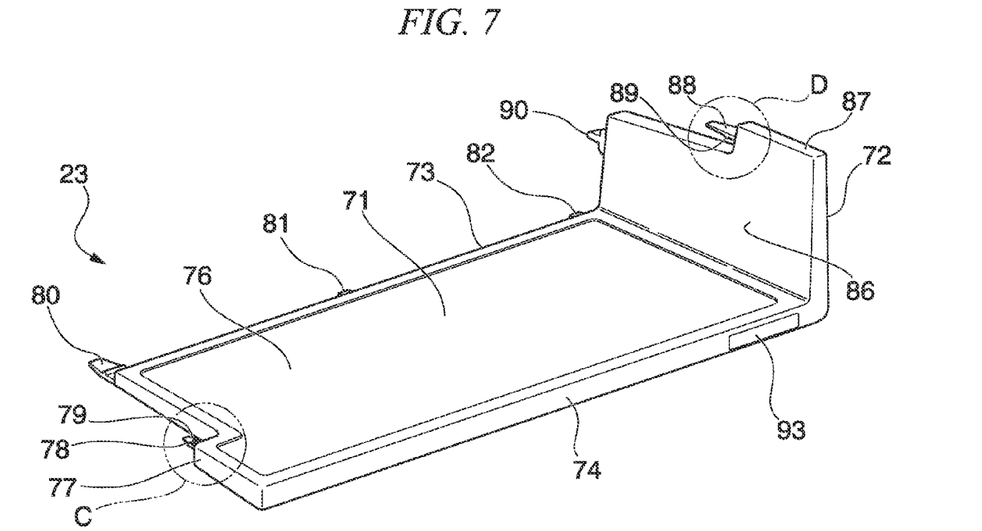
FIG. 7 is a perspective view showing a separator of the storage device for a vehicle related to the first embodiment of the invention.
Figure 8:
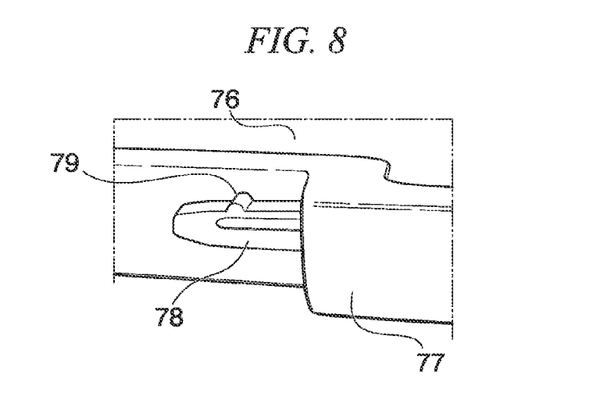
FIG. 8 is a partial enlarged view of portion C in FIG. 7, showing the separator of the storage device for a vehicle related to the first embodiment of the invention.
Figure 9:
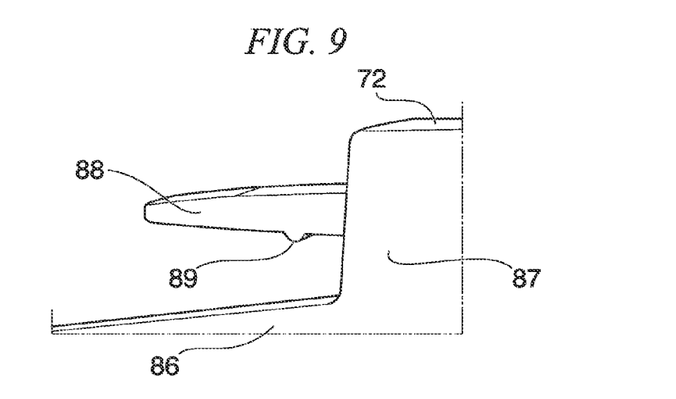
FIG. 9 is a partial enlarged view of portion D in FIG. 7, showing the separator of the storage device for a vehicle related to the first embodiment of the invention.

The separator 23 shown in FIGS. 2 and 3 is formed by integral molding of synthetic resin. The separator 23 is formed in a substantially L shape having two plate sections 71 and 72 (a first plate section 71 and a second plate section 72) intersecting one another, as shown in FIG. 7. The separator 23 is mounted on the back surface section 29 of the storage section 22, as shown in FIGS. 2 and 3, such that a front surface portion 73 on one side forming an L-shaped structure is located in the front in a mounting direction and a back surface portion 74 on the other side forming an L-shaped structure is located in the rear in the mounting direction. In a case of removing the separator 23 from the back surface section 29, a crew opens the lid 16, puts the hand in the storage section 22 through the opening portion 21, and pulls out the separator 23 in a direction of the opening portion 21 which is the rear in the mounting direction. On the other hand, in a case of mounting the separator 23 on the back surface section 29, the crew opens the lid 16 and pushes in the separator 23 in a direction of the back surface section 29 which is the front in the mounting direction of the separator 23.

The separator 23 is formed in a substantially L shape having the two plate sections 71 and 72 intersecting one another, as shown in FIG. 3, as viewed from the mounting direction on the storage section 22. The length in a direction perpendicular to the mounting direction of the plate section 71 is longer than the length in a direction perpendicular to the mounting direction of the plate section 72.

As shown in FIG. 7, the plate section 71 has a basal plate section 76 and a projecting plate section 77. The basal plate section 76 extends from the plate section 72. The projecting plate section 77 is provided at the back surface portion 74 of the basal plate section 76 and protrudes to the opposite direction to the plate section 72 from an end portion on the opposite side to the plate section 72 in the same plane as the basal plate section 76.

A projecting portion 78 (a second projecting portion) is formed on the surface on the opposite side to the back surface portion 74 of the projecting plate section 77. The projecting portion 78 protrudes in the opposite direction to the back surface portion 74, that is, toward the front in the mounting direction. A locking claw 79 shown in FIG. 8 too, which protrudes in the same direction as an extending direction of the plate section 72 with respect to the plate section 71, is formed at an intermediate position in a projecting direction of the projecting portion 78. The locking claw 79 protrudes from the projecting portion 78 to intersect the mounting direction.

As shown in FIG. 7, projecting portions 80 to 82 are formed at the front surface portion 73 of the basal plate section 76. The projecting portion 80 is provided at an end portion of the front surface portion 73 at a position close to the projecting plate section 77. The projecting portion 81 is provided substantially at the central position in a length direction. The projecting portion 82 is provided at an end portion of the front surface portion 73 at a position close to the plate section 72. The projecting portions 80 to 82 are formed to protrude in the opposite direction to the back surface portion 74, that is, toward the front in the mounting direction.

The plate section 72 has a basal plate section 86 and a projecting plate section 87. The basal plate section 86 extends from the plate section 71. The projecting plate section 87 is provided at the back surface portion 74 of the basal plate section 86 and protrudes to the opposite direction to the plate section 71 from an end portion on the opposite side to the plate section 71 in the same plane as the basal plate section 86.

A projecting portion 88 (a first projecting portion) is formed on the surface on the opposite side to the back surface portion 74 of the projecting plate section 87. The projecting portion 88 protrudes in the opposite direction to the back surface portion 74, that is, toward the front in the mounting direction. A locking claw 89 also shown in FIG. 9, which protrudes toward the basal plate section 86, is formed at an intermediate position in a projecting direction of the projecting portion 88. The locking claw 89 protrudes from the projecting portion 88 to intersect the mounting direction. The locking claw 89 and the locking claw 79 are formed so as to protrude in directions opposite to each other.

A projecting portion 90 is formed at the front surface portion 73 of the basal plate section 86. The projecting portion 90 is formed to protrude in the opposite direction to the back surface portion 74, that is, toward the front in the mounting direction.

Figure 10:
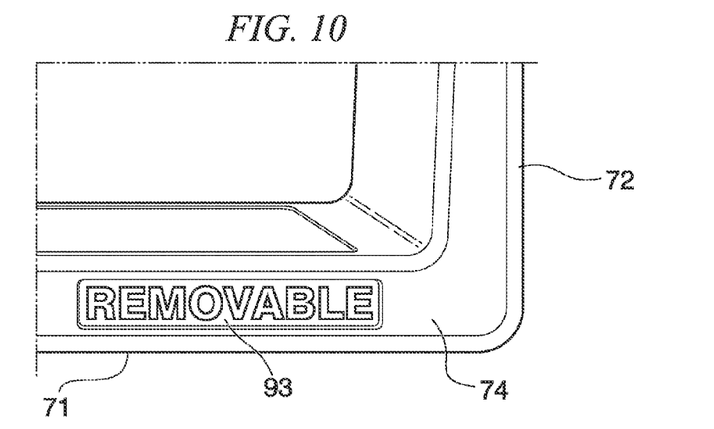
FIG. 10 is a partial enlarged view of an portion E in FIG. 3, showing the separator of the storage device for a vehicle related to the first embodiment of the invention.

At the back surface portion 74 of the separator 23, a character string 93, "REMOVABLE", which indicates that the separator 23 is removable is formed at the position close to the plate section 72 of the plate section 71, as shown in FIG. 10. The indication (the character string) is formed by a mold at the time of integral molding of the separator 23 and the character string is formed so as to be recessed from the surface of the back surface portion 74.

Each of the projecting portions 78, 80 to 82, 88, and 90 shown in FIG. 7 is engaged with a given engagement hole among the engagement holes 40 to 44, and 60 to 64 provided at the back surface section 29 on the back side in the mounting direction in the storage section 22 shown in FIG. 4. In this way, the separator 23 is fixed to the storage section 22.

In this case, the projecting portion 78 shown in FIG. 7 is engaged with the engagement hole 60 of the mounting seat section 53 shown in FIG. 4, the projecting portion 80 shown in FIG. 7 is engaged with the engagement hole 61 shown in FIG. 4, the projecting portion 81 shown in FIG. 7 is engaged with the engagement hole 62 shown in FIG. 4, the projecting portion 82 shown in FIG. 7 is engaged with the engagement hole 63 shown in FIG. 4, the projecting portion 88 shown in FIG. 7 is engaged with the engagement hole 40 of the mounting seat section 33 shown in FIG. 4, and the projecting portion 90 shown in FIG. 7 is engaged with the engagement hole 64 shown in FIG. 4. In this way, the separator 23 is mounted in the storage section 22, as shown in FIG. 3. Such a position of the separator 23 in the storage section 22 is a partitioning position to divide a space of the storage section 22 into two compartments. Specifically, an upper space which is surrounded by the ceiling surface section 27, the surface portion 48 of the sidewall surface section 26, the plate section 71 of the separator 23, and the plate section 72 is one compartment (a first compartment). This space is a storage compartment 95 which is formed at a position close to the sidewall surface section 26. On the other hand, a space which is surrounded by the ceiling surface section 27, the sidewall surface section 25, the bottom surface section 28 (refer to FIG. 4), the surface portions 49 and 50 of the sidewall surface section 26, the plate section 71 of the separator 23, and the plate section 72 is a remaining space (a second compartment). This space is an L-shaped storage compartment 96. In a case where the separator 23 is disposed at the partitioning position, the space of the storage section 22 is divided into two compartments (the storage compartments 95 and 96) in this manner.

When the separator 23 is disposed at this partitioning position, the first plate section 71 is disposed so as to follow the ceiling surface section 27 in a state where the second plate section 72 is interposed between the ceiling surface section 27 that is a first inner surface of the storage section 22 and the first plate section 71. Further, at this time, the second plate section 72 is disposed so as to follow the surface portion 48 in a state where the first plate section 71 is interposed between the surface portion 48 of the sidewall surface section 26 that is a second inner surface of the storage section 22 adjacent to the ceiling surface section 27 and the second plate section 72.

Figure 11:
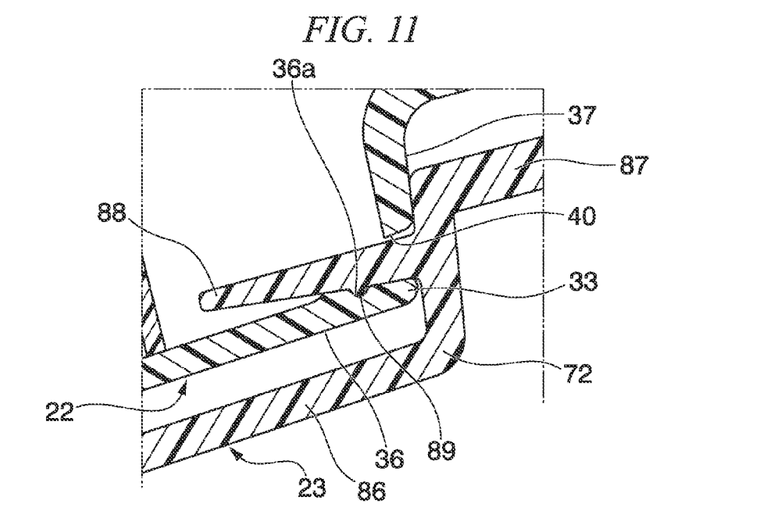
FIG. 11 is a partial enlarged cross-sectional view along line X-X of FIG. 3, showing a projecting portion and a mounting seat section of the storage device for a vehicle related to the first embodiment of the invention.
Figure 12:
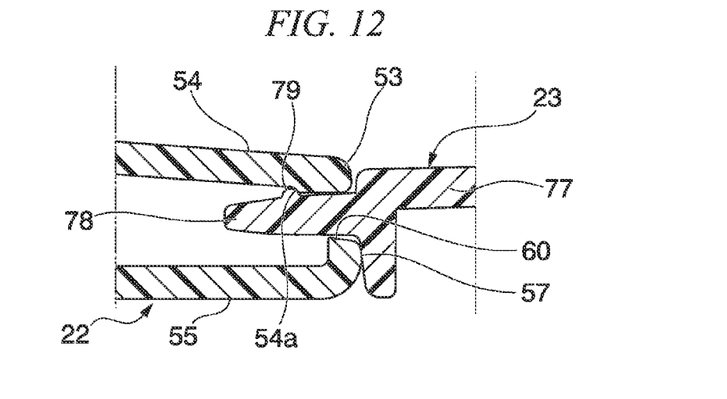
FIG. 12 is a partial enlarged cross-sectional view along line Y-Y of FIG. 3, showing the projecting portion and the mounting seat section of the storage device for a vehicle related to the first embodiment of the invention.
Figure 13:
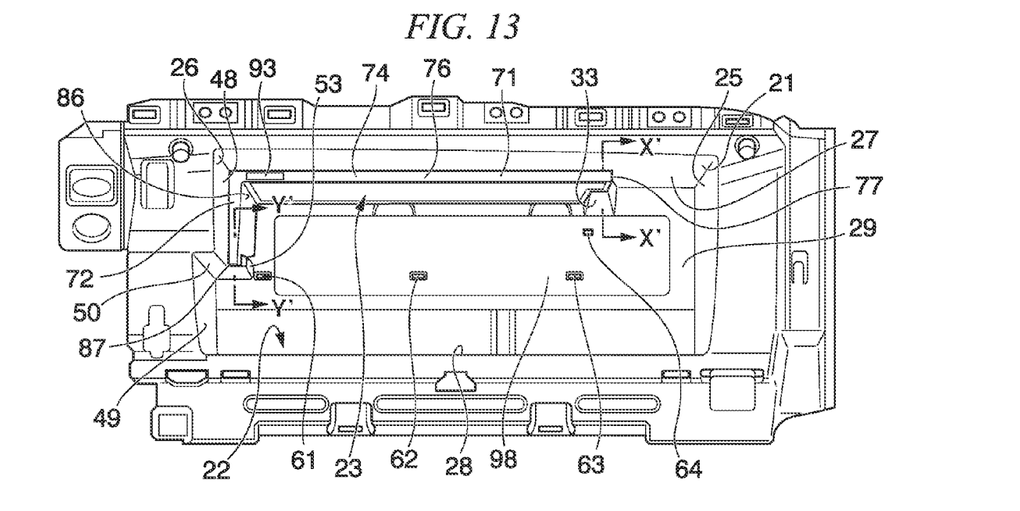
FIG. 13 is a front view showing the storage section and the separator of the storage device for a vehicle related to the first embodiment of the invention.

In addition, when the separator 23 is disposed at this partitioning position, the locking claw 89 of the projecting portion 88 (the first projecting portion) is engaged with an engaging recessed portion 36a formed at the position of the engagement hole 40 (a first engagement hole) of the extending plate section 36 of the mounting seat section 33, as shown in FIG. 11. Further, at this partitioning position, the locking claw 79 of the projecting portion 78 (the second projecting portion) is engaged with an engaging step portion 54a formed at the position of the engagement hole 60 (a second engagement hole) of the extending plate section 54 of the mounting seat section 53, as shown in FIG. 12. In addition, the engaging recessed portion 36a and the engaging step portion 54a are also formed in directions opposite to each other in accordance with the locking claws 79 and 89.

When the separator 23 is disposed at the partitioning position shown in FIG. 3, the storage compartment 95 over the separator 23 can accommodate a portfolio with, for example, a vehicle inspection certificate, an insurance card, an owner's manual, or the like stored therein, and the remaining storage compartment 96 under the separator 23 can accommodate a thin tissue box, a plurality of slim CD cases, or the like.

Further, the separator 23 can be removed from the storage section 22, turned upside down with respect to the partitioning position, and then mounted in the storage section 22.

In this case, the projecting portion 78 shown in FIG. 7 is engaged with the engagement hole 40 of the mounting seat section 33 shown in FIG. 4, the projecting portion 80 shown in FIG. 7 is engaged with the engagement hole 41 shown in FIG. 4, the projecting portion 81 shown in FIG. 7 is engaged with the engagement hole 42 shown in FIG. 4, the projecting portion 82 shown in FIG. 7 is engaged with the engagement hole 43 shown in FIG. 4, the projecting portion 88 shown in FIG. 7 is engaged with the engagement hole 60 of the mounting seat section 53 shown in FIG. 4, and the projecting portion 90 shown in FIG. 7 is engaged with the engagement hole 44 shown in FIG. 4. In this way, the separator 23 is mounted in the storage section 22. Such a position of the separator 23 in the storage section 22 is a compartment expanding position to form a single compartment in the space of the storage section 22. Specifically, at the compartment expanding position, a storage compartment 98 which is surrounded by the ceiling surface section 27, the plate section 71 of the separator 23, the sidewall surface section 25, the bottom surface section 28, the surface portions 49 and 50 of the sidewall surface section 26, and the plate section 72 of the separator 23 is formed in the space of the storage section 22 shown in FIG. 13.

When the separator 23 is disposed at this compartment expanding position, the separator 23 is disposed such that the first plate section 71 follows in proximity to the ceiling surface section 27 that is the first inner surface of the storage section 22 and the second plate section 72 follows in proximity to the surface portion 48 of the sidewall surface section 26 that is the second inner surface of the storage section 22 adjacent to the ceiling surface section 27. Accordingly, the storage compartment 98 that is formed by the separator 23 which is disposed at the compartment expanding position has a larger volume than either of the two compartments, the storage compartments 95 and 96, that are formed by the separator 23 which is disposed at the partitioning position shown in FIG. 3.

Figure 14:
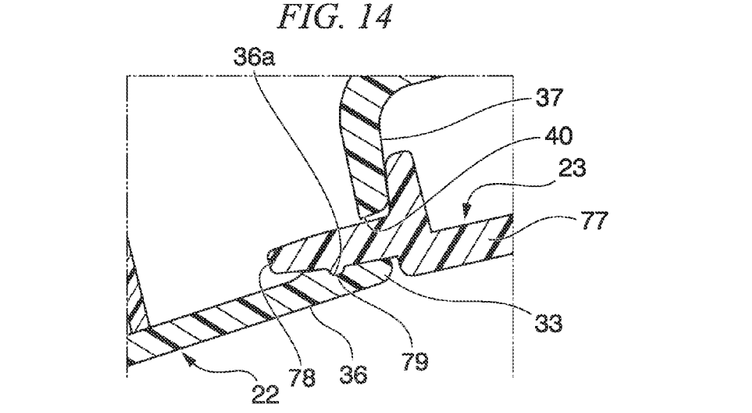
FIG. 14 is a partial enlarged cross-sectional view along line X'-X' of FIG. 13, showing the projecting portion and the mounting seat section of the storage device for a vehicle related to the first embodiment of the invention.
Figure 15:
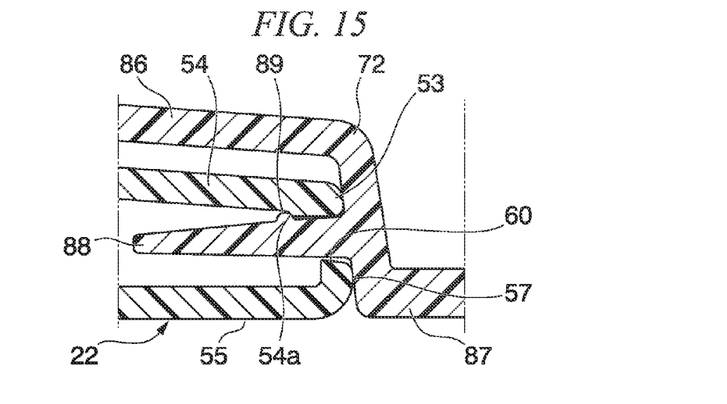
FIG. 15 is a partial enlarged cross-sectional view along line Y'-Y' of FIG. 13, showing the projecting portion and the mounting seat section of the storage device for a vehicle related to the first embodiment of the invention.

In addition, when the separator 23 is disposed at this compartment expanding position, the locking claw 79 of the projecting portion 78 (the second projecting portion) is engaged with the engaging recessed portion 36a formed at the position of the engagement hole 40 (the first engagement hole) of the extending plate section 36 of the mounting seat section 33, as shown in FIG. 14. Further, at this compartment expanding position, the locking claw 89 of the projecting portion 88 (the first projecting portion) is engaged with the engaging step portion 54a formed at the position of the engagement hole 60 (the second engagement hole) of the extending plate section 54 of the mounting seat section 53, as shown in FIG. 15.

When the separator 23 is disposed at the compartment expanding position described above, the volume of the storage compartment 98 is increased close to the maximum of the space in the storage section 22 and becomes capable of accommodating a larger received object than in the storage compartments 95 and 96. In addition, since the detachable separator 23 can remain fixed to the storage section 22, the loss of the separator 23 can also be prevented.

By the above, the relationship that the projecting portions 78 and 88 shown in FIG. 7 and the engagement holes 40 and 60 shown in FIG. 4, which are provided at two locations, are engaged with each other is different according to the partitioning position or the compartment expanding position. That is, when the separator 23 is disposed at the partitioning position, the second projecting portion 78 is engaged with the second engagement hole 60 and the first projecting portion 88 is engaged with the first engagement hole 40. When the separator 23 is disposed at the compartment expanding position, the second projecting portion 78 is engaged with the first engagement hole 40 and the first projecting portion 88 is engaged with the second engagement hole 60.

According to the storage device for a vehicle 12 related to the first embodiment described above, each of the projecting portions 78, 80 to 82, 88, and 90 protruding toward the front in the mounting direction is engaged with a given engagement hole among the engagement holes 40 to 44, and 60 to 64 of the back side of the storage section 22, whereby the separator 23 is fixed to the storage section 22. Further, by turning the disposition position (the disposition direction) of the separator 23 upside down, the separator 23 is mounted at the partitioning position to divide the space in the storage section 22 into the two storage compartments 95 and 96 or the compartment expanding position to form a single storage compartment 98 larger than either of the storage compartments 95 and 96. For this reason, even if a storage form is variable, the mounting rigidity thereof can be secured. Further, since the separator 23 is formed in a substantially L shape, the rigidity of the separator 23 itself becomes high. Accordingly, even if a storage form is variable, abnormal noise which is generated during running of a vehicle can be suppressed. Further, since a resin hinge is not used, even if a storage form is repeatedly changed, breakage does not easily occur, and thus durability can be improved. Therefore, the merchantability of a vehicle with the storage device for a vehicle 12 mounted therein can be improved.

Further, the relationship that the projecting portions 78 and 88 of two locations and the engagement holes 40 and 60 of two locations are engaged with each other is different according to the partitioning position or the compartment expanding position. That is, when the separator 23 is disposed at the partitioning position, the second projecting portion 78 is engaged with the second engagement hole 60 and the first projecting portion 88 is engaged with the first engagement hole 40. On the other hand, when the separator 23 is disposed at the compartment expanding position, the second projecting portion 78 is engaged with the first engagement hole 40 and the first projecting portion 88 is engaged with the second engagement hole 60. For this reason, in a case where the projecting portions 78 and 88 of two locations are engaged with the engagement holes of two locations at each of the partitioning position and the compartment expanding position, the number of engagement holes requiring a maximum of four locations can be reduced to two locations, the engagement holes 40 and 60. Therefore, the shape of the storage section 22 can be simplified, and thus the cost can be reduced.

Further, the locking claw 79 which is formed at the second projecting portion 78 and the locking claw 89 which is formed at the first projecting portion 88 are formed in directions opposite to each other. For this reason, at the partitioning position and the compartment expanding position, it is possible to make each of the locking claws 79 and 89 be locked to the same engaging recessed portion 36a of the engagement hole 40 and make each of the locking claws 79 and 89 be locked to the same engaging step portion 54a of the engagement hole 60. Therefore, the shapes of the engagement holes 40 and 60 of the storage section 22 can be simplified, and thus the cost can be reduced.

Further, at the compartment expanding position, the first plate section 71 of the separator 23 follows in proximity to the ceiling surface section 27 that is the first inner surface of the storage section 22 and the second plate section 72 of the separator 23 follows in proximity to the sidewall surface section 26 that is the second inner surface of the storage section 22. For this reason, the size (the volume) of the storage compartment 98 in the storage section 22 can be increased close to the maximum without being interfered with the separator 23.

Further, since the character string 93 which indicates that the separator 23 is removable is indicated at the back surface portion 74 of the separator 23, it is possible to make the crew recognize the fact that the separator 23 is removable.

A storage device for a vehicle related to a second embodiment of the invention will be described focusing on different portions from the first embodiment mainly with reference to FIGS. 16 to 18B.

Figure 16:
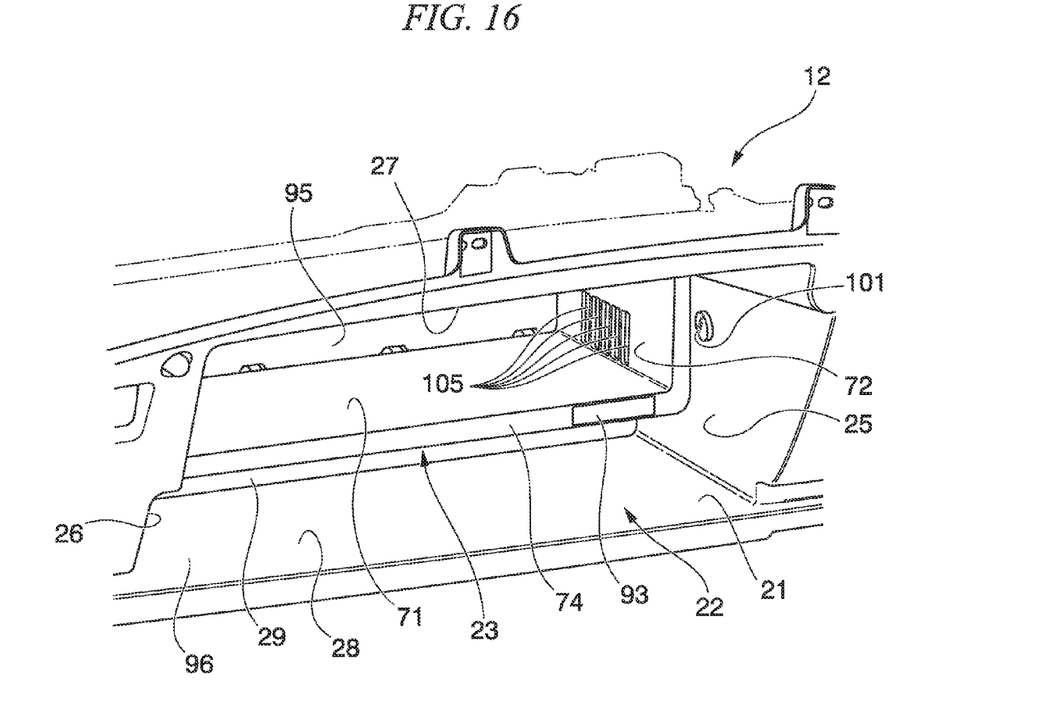
FIG. 16 is a perspective view showing a storage section and a separator of a storage device for a vehicle related to a second embodiment of the invention.

As shown in FIG. 16, in the storage device for a vehicle 12 related to the second embodiment, a light source 101 is provided at the sidewall surface section 25 of the storage section 22. The light source 101 illuminates the storage section 22 in an irradiation direction which is directed to the sidewall surface section 26 on the opposite side to the sidewall surface section 25 in the vehicle width direction. The position of the light source 101 is aligned with the position of the plate section 72 of the separator 23 which is disposed at the partitioning position, in a direction connecting the ceiling surface section 27 and the bottom surface section 28 of the storage section 22. The light source 101 faces the plate section 72 and emits light toward the plate section 72.

Figure 17:
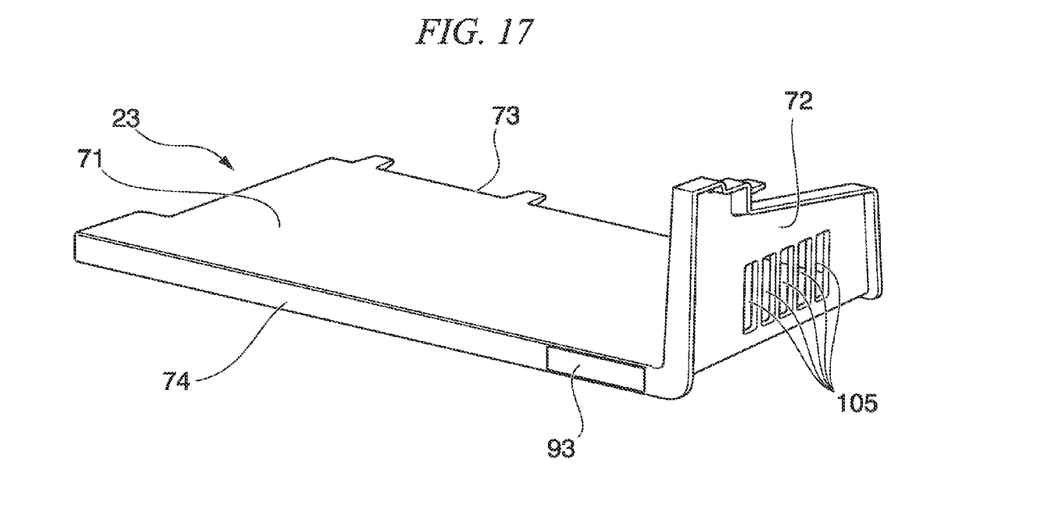
FIG. 17 is a perspective view showing the separator of the storage device for a vehicle related to the second embodiment of the invention.

As shown in FIG. 17, in the plate section 72 of the separator 23, a plurality of slits 105 extending in a direction perpendicular to the plate section 71 is formed (specifically, at five locations). The slits 105 are arranged at regular intervals in a direction connecting the front surface portion 73 and the back surface portion 74 such that the positions and the lengths of the slits 105 in a direction perpendicular to the plate section 71 are uniform. The slit 105 is formed in the plate section 72 such that the position of the slit 105 in a direction perpendicular to the plate section 71 is closer to the plate section 71.

Figure 18A:
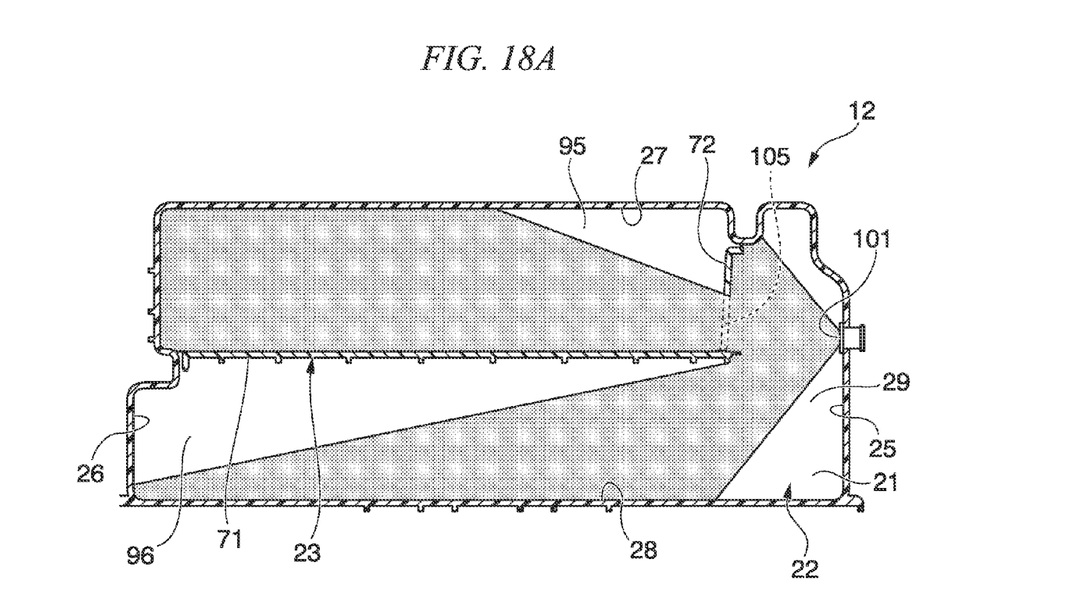
FIG. 18A is a front view showing the storage section and the separator of the storage device for a vehicle related to the second embodiment of the invention, wherein a light irradiation area in a state where the separator is disposed at a partitioning position is shown by hatching.

In a state where the separator 23 is disposed at the partitioning position, as shown in FIG. 18A, the light source 101 is provided at the sidewall surface section 25 forming the storage compartment 96 and in other word, provided at the sidewall surface section 25 of the storage section 22 forming the storage compartment 96 in a state where the separator 23 is disposed at the partitioning position. The position of the light source 101 is aligned with the positions of lower portions of the slits 105 of the separator 23 disposed at the partitioning position, in a direction connecting the ceiling surface section 27 and the bottom surface section 28 of the storage section 22, and disposed above the upper surface of the plate section 71 of the separator 23 disposed at the partitioning position (the bottom of the storage compartment 95).

In a state where the separator 23 is disposed at the partitioning position, the slits 105 provided in the separator 23 transmit light emitted from the light source 101 to the storage compartment 95 which becomes the opposite side to the compartment where the light source 101 of the separator 23 is disposed, of the two storage compartments 95 and 96, as shown by hatching in FIG. 18A. The mutual positions of the light source 101 and the slit 105 are set such that light reaches an end portion of the sidewall surface section 26 in the bottom of the storage compartment 95 which is formed by the upper surface of the plate section 71 of the separator 23 and such that the entire bottom of the storage compartment 95 except for an area (some areas) close to the light source 101 can be irradiated with light.

The storage compartment 96 where the light source 101 of the separator 23 is disposed, of the two storage compartments 95 and 96, is directly irradiated with light emitted from the light source 101, as shown by hatching in FIG. 18A. The position of the light source 101 with respect to the separator 23 is set such that light reaches an end portion of the sidewall surface section 26 in the bottom surface section 28 of the storage section 22 which becomes the bottom of the storage compartment 96 and such that the entire bottom surface section 28 except for an area (some areas) close to the light source 101 can be irradiated with light.

That is, the positional relationship or the like between the light source 101, the separator 23, and the slit 105 is set such that light reaches end portions which are located on the opposite side to the light source 101 in the bottoms of both the storage compartments 95 and 96. In this way, even at the nighttime, the insides of the two storage compartments 95 and 96 are more visible, and thus it becomes easy to put a received object in the storage section 22 and take the received object out of the storage section 22.

Figure 18B:
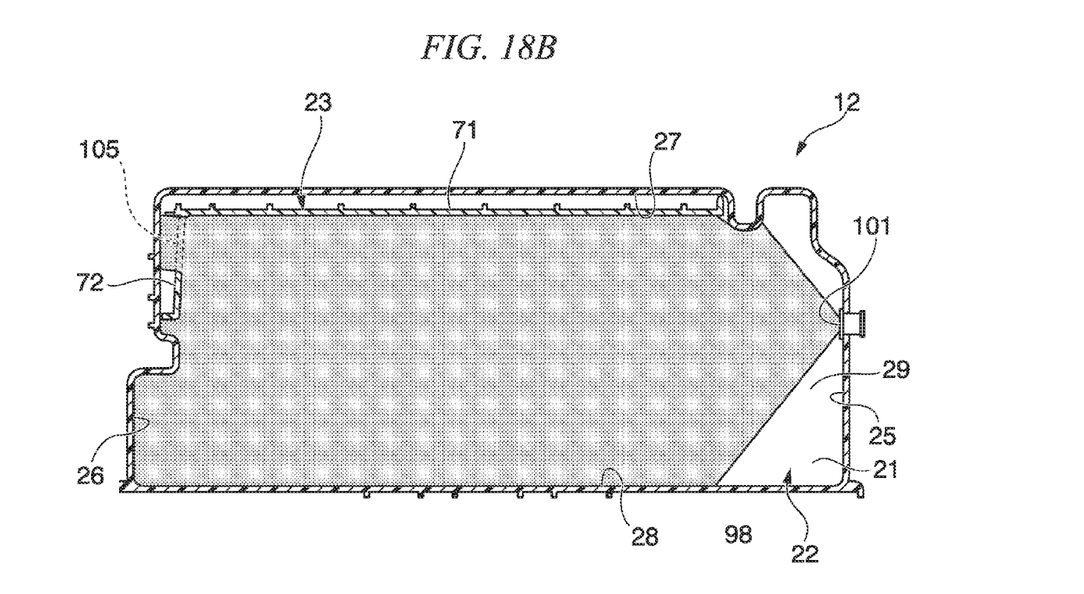
FIG. 18B is a front view showing the storage section and the separator of the storage device for a vehicle related to the second embodiment of the invention, wherein a light irradiation area in a state where the separator is disposed at a compartment expanding position is shown by hatching.

In a state where the separator 23 is disposed at the compartment expanding position, the light source 101 is provided at the position of the storage compartment 98 of the storage section 22, as shown in FIG. 18B. In other words, the light source 101 is provided at the position of the storage section 22 which is not covered with the separator 23 disposed at the compartment expanding position. In a state where the separator 23 is disposed at the compartment expanding position, the storage compartment 98 is directly irradiated with light emitted from the light source 101, as shown by hatching in FIG. 18B. The position of the light source 101 is set such that light reaches an end portion of the sidewall surface section 26 in the bottom surface section 28 of the storage section 22 which becomes the bottom of the storage compartment 98 and such that the entire bottom surface section 28 except for an area (some areas) close to the light source 101 can be irradiated with light.

According to the second embodiment described above, as shown in FIG. 18B, in a state where the separator 23 is disposed at the compartment expanding position to form the large storage compartment 98 in the storage section 22, the storage compartment 98 is directly irradiated with light by the light source 101 provided in the storage compartment 98 of the storage section 22. Further, as shown in FIG. 18A, in a state where the separator 23 is disposed at the partitioning position to form the two storage compartments 95 and 96 in the storage section 22, the light source 101 directly emits light to the storage compartment 96 in which the light source 101 is disposed with respect to the separator 23, of the storage compartments 95 and 96, and the storage compartment 95 on the opposite side to the compartment in which the light source 101 is disposed is irradiated with light penetrating the slits 105 of the separator 23 from the light source 101. Therefore, the large storage compartment 98 which is formed by the separator 23 disposed at the compartment expanding position and the two storage compartments 95 and 96 which are formed by the separator 23 disposed at the partitioning position can be favorably irradiated with light by the single light source 101. According to this configuration, it is not necessary to add a light source or add a light guide plate, and thus the cost can be reduced. Further, since a lighting window is formed by the slits 105, falling of an article through the lighting window from the storage compartment 95 can be suppressed.

While preferred embodiments of the invention have been described and illustrated above, it should be understood that these are exemplary of the invention and are not to be considered as limiting. Additions, omissions, substitutions, and other modifications can be made without departing from the scope of the present invention.

Accordingly, the invention is not to be considered as being limited by the foregoing description, and is only limited by the scope of the appended claims.

What is claimed is:

1. A storage device for a vehicle comprising:
   a storage section which has a space and has an engagement hole provided on the back side in a mounting direction and in which an article is put in and taken out through an opening portion; and
   a detachable separator which partitions the space in the storage section, is formed in a substantially L shape having two plate sections intersecting one another when viewed from the mounting direction into the storage section, has a projecting portion which protrudes toward the front in the mounting direction and is engaged with the engagement hole, and is mounted in the engagement hole at a partitioning position to divide the space into two compartments and a compartment expanding position to form a single compartment larger than either of the two compartments in the space.

2. The storage device for a vehicle according to claim 1, wherein
   each of the projecting portion and the engagement hole is formed at at least two locations,
   when the separator is disposed at the partitioning position, a first projecting portion is engaged with a first engagement hole and a second projecting portion is engaged with a second engagement hole, and
   when the separator is disposed at the compartment expanding position, the first projecting portion is engaged with the second engagement hole and the second projecting portion is engaged with the first engagement hole.

3. The storage device for a vehicle according to claim 2, further comprising:
   locking claws which are provided at the first projecting portion and the second projecting portion, protrude to intersect the mounting direction, and are formed so as to protrude in directions opposite to each other.

4. The storage device for a vehicle according to claim 1, wherein
   at the compartment expanding position, a first plate section of the separator follows in proximity to a first inner surface of the storage section and a second plate section of the separator follows in proximity to a second inner surface adjacent to the first inner surface of the storage section.

5. The storage device for a vehicle according to claim 1, wherein
   in the separator, an indication that the separator is removable is given at a back surface portion in the mounting direction.

6. The storage device for a vehicle according to claim 1, further comprising:
   a light source provided at a sidewall surface section of the storage section, wherein
   in a state where the separator is disposed at the compartment expanding position, the light source irradiates the single compartment of the storage section.

7. The storage device for a vehicle according to claim 1, further comprising:
   a light source provided at a sidewall surface section of the storage section, wherein
   a slit transmitting light is provided at the separator, and in a state where the separator is disposed at the partitioning position, the light source irradiates the compartment where the light source is disposed, of the two compartments, and the light source irradiates the compartment on the opposite side to the compartment where the light source is disposed, of the two compartments, through the slit.

* * * * *